US008645182B2

(12) United States Patent
Johnson et al.

(10) Patent No.: US 8,645,182 B2
(45) Date of Patent: Feb. 4, 2014

(54) INTEGRATED CALENDAR AND TASK SCHEDULER

(75) Inventors: Conrad James Johnson, Pflugerville, TX (US); James Ealem Shewbert, Cedar Park, TX (US); Perry Lee Statham, Round Rock, TX (US); Sandra Lee Tipton, Austin, TX (US); Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 11/865,931

(22) Filed: Oct. 2, 2007

(65) Prior Publication Data

US 2009/0089133 A1 Apr. 2, 2009

(51) Int. Cl.
*G06Q 10/00* (2012.01)

(52) U.S. Cl.
USPC ....... 705/7.21; 705/7.13; 705/7.18; 705/7.19; 718/103

(58) Field of Classification Search
USPC .............. 705/7.13, 7.18, 7.19, 7.21; 718/103
See application file for complete search history.

(56) References Cited

U.S. PATENT DOCUMENTS

| 5,050,077 | A | * | 9/1991 | Vincent | 705/7.19 |
| 5,692,125 | A | * | 11/1997 | Schloss et al. | 705/9 |
| 6,073,110 | A | * | 6/2000 | Rhodes et al. | 705/8 |
| 6,369,840 | B1 | * | 4/2002 | Barnett et al. | 715/853 |
| 6,892,356 | B2 | * | 5/2005 | Ishizaki et al. | 715/751 |
| 7,167,833 | B2 | * | 1/2007 | Mashiko et al. | 705/9 |
| 7,370,282 | B2 | * | 5/2008 | Cary | 715/772 |
| 7,499,715 | B2 | * | 3/2009 | Carro et al. | 455/456.3 |
| 2004/0244005 | A1 | * | 12/2004 | Ancier | 718/103 |
| 2005/0039142 | A1 | * | 2/2005 | Jalon et al. | 715/823 |
| 2005/0177404 | A1 | * | 8/2005 | Hyttinen | 705/7 |
| 2005/0222971 | A1 | | 10/2005 | Cary | |
| 2006/0068812 | A1 | | 3/2006 | Carro et al. | |

FOREIGN PATENT DOCUMENTS

| JP | 2000057217 A | 2/2000 |
| WO | 0137541 A2 | 5/2001 |

OTHER PUBLICATIONS

The Tyche CPU scheduler by Bavier, Andrew, Ph.D., Princeton University, 2004, 166 pages; AAT 3143409.*
Weber, Julie S; Yorke-Smith, Neil. Designing for Usability of an Adaptive Time Management Assistant. AI Magazine 30.4 (Winter 2009): 103-109.*

* cited by examiner

*Primary Examiner* — Lynda Jasmin
*Assistant Examiner* — Timothy Padot
(74) *Attorney, Agent, or Firm* — Yee & Associates, P.C.; Jeffrey S. LaBaw

(57) ABSTRACT

A computer implemented method for integrating a calendar and task scheduler to enable automatic scheduling of meetings and assignment of tasks based on priority. With the illustrative embodiments, a task in a user's calendaring system may be split into multiple time blocks, and each time block for the task may then be scheduled around meetings in a user's calendar. Tasks that are scheduled in the user's calendar may also be automatically rescheduled when meetings within the user's calendar change. Tasks may be scheduled over lower priority meetings in the user's calendar as needed in order to meet the due dates assigned to the tasks. The illustrative embodiments also allow for automatically adjusting meeting or task priorities based on policies, and identifying classes of activities that may be performed concurrently.

16 Claims, 6 Drawing Sheets

INTEGRATED CALENDAR AND TASK SCHEDULER

BACKGROUND OF THE INVENTION

1. Field of the Invention

The present invention relates generally to an improved data processing system, and in particular to a computer implemented method for integrating a calendar and task scheduler to enable automatic scheduling of meetings and assignment of tasks based on priority.

2. Description of the Related Art

An electronic calendar system is designed to maintain useful information for a user. Electronic calendar systems allow maintenance of a personal schedule of activities such as meeting appointments, teleconference schedules, vacation and business travel plans, and so forth. Examples of electronic calendaring systems include Microsoft Outlook™ 2000, Lotus Organizer™, and Lotus Notes™. Such systems are quite popular among users. "Outlook" is a trademark of Microsoft Corporation. Lotus Organizer and Lotus Notes are trademarks of International Business Machines Corporation.

Use of electronic calendaring systems for purposes such as scheduling meetings of multiple persons is known in the art. Conventional electronic calendar systems allow users to send electronic invitations to other users and for a user receiving an electronic calendar invitation to either accept or decline the invitation. An invitation typically includes a description of the event, a location of the event, and a scheduled start and end time of the event. An invitation decline message may be returned to the user that issued the invitation when the invitation is declined by an invited user. Likewise, an invitation acceptance message may be returned to the user that issued the invitation when the user accepts the invitation. When a user accepts an invitation, the scheduled event is recorded in the electronic calendar of the accepting user. Additionally, a record of the calendar of the user that issued the invitation is updated to reflect the expected attendance by the accepting user. Accordingly, the calendar of the user that issued the invitation includes an indication of the number of users that have accepted the invitation and the inviting user can plan for the event in response to the anticipated attendance.

For example, an invitation list may be created for a particular meeting, and a calendaring software application may then use this list to check each invitee's calendar for available time periods. A meeting may then be scheduled during a time period in which all, or some majority, of the invitees have sufficient time available on their calendar.

Conventional task planning tools in a calendaring system allow a user to schedule tasks to be performed by the user within blocks of time allocated for project work. The user may also estimate the time needed to complete a task, set start times and due dates for the task, and record the completion of the task. For example, a user may schedule a block of time for a task against 'free time' in the user's calendar. The 'free time' may include any time in which the user does not have a scheduled meeting of appointment in the calendar. However, with conventional task planning tools, when meetings and appointments are added or removed from the user's calendar, the user must manually adjust the blocks of time allocated for tasks. Thus, if the user is invited to a new meeting which occurs during a block of time already allocated to a task, the user must manually adjust the time allotted to the task to another block of 'free time' in the user's calendar.

From a meeting scheduling perspective, the coordinator of a meeting must typically do a lot of coordination via the telephone or electronic mail to find a time slot when the meeting participants can get together. When scheduling a meeting, this coordination is necessary in existing calendaring systems because the free time shown on a user's calendar does not reflect any priorities of the user. For instance, the user may have multiple meetings and tasks scheduled in the user's calendar. Since the meeting coordinator has no way to determine whether a meeting or a task in the user's calendar has a higher priority than the meeting to be scheduled, the meeting coordinator must contact the user to determine whether the time blocked for another meeting or task is a hard commitment, or whether the time could be made available if the priority of the existing task or meeting is low.

SUMMARY OF THE INVENTION

The illustrative embodiments provide a computer implemented method for integrating a calendar and task scheduler to enable automatic scheduling of meetings and assignment of tasks based on priority. A task to be performed by a user is created in the user's calendaring and task scheduler. The task comprises a completion block of time. A determination is then made as to whether there is an available block of free time prior to a due date of the task in the user's calendaring and task scheduler. If there are no available blocks of free time in the user's calendaring and task scheduler prior to the due date of the task, the priority level of the task is compared to the priority level of a meeting or second task scheduled in the calendaring and task scheduler. If the priority level of the meeting or second task is lower than the priority level of the task, the task is scheduled over at least a portion of a time block of the lower priority meeting or second task.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
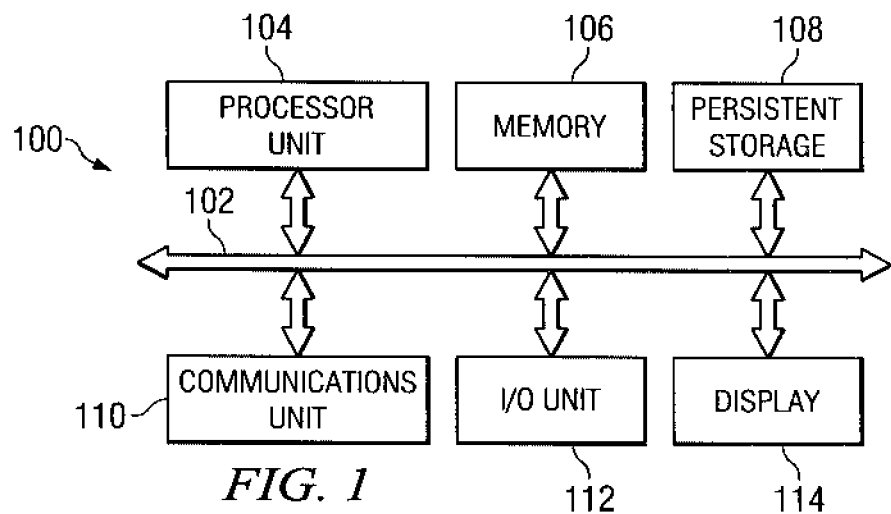
FIG. 1 is a exemplary block diagram of a data processing system in which the illustrative embodiments may be implemented.

Turning now to FIG. 1, a diagram of a data processing system is depicted in accordance with an illustrative embodiment of the present invention. In this illustrative example, data processing system 100 is shown to include communications fabric 102, which provides communications between processor unit 104, memory 106, persistent storage 108, communications unit 110, input/output (I/O) unit 112, and display 114, although one or more of these components may be omitted from the data processing system.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit may be a symmetric multiprocessor system containing multiple processors of the same type.

Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above.

Communications unit 110, in these examples, provides for communications with other data processing systems or devices. In these examples, communications unit 110 is a network interface card. Communications unit may provide communications through the use of either or both physical and wireless communications links.

I/O unit 112 allows for input and output of data with other devices that may be connected to data processing system 100. For example, I/O unit 112 may provide a connection for user input through a keyboard and mouse. Further, I/O unit 112 may send output to a printer. Display 114 may be provided to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106.

It should be appreciated that FIG. 1 is only exemplary and are not intended to assert or imply any limitation with regard to the environments in which different embodiments may be implemented. Many modifications to the depicted environments may be made.

The illustrative embodiments provide a mechanism for integrating a calendar and task scheduler to enable automatic scheduling of meetings and assignment of tasks based on priority. A calendar tool is provided which allows a user to schedule meetings and appointments. A task planning tool is also provided which allows the user to enter information about tasks to be performed by the user. With the illustrative embodiments, the integrated calendar and task scheduler uses a scheduling algorithm which allocates blocks of time in which the user will work on the tasks. These tasks are typically allocated to "free time" in the user's calendar. "Free time" is time not otherwise allocated to meetings, appointments, or other tasks. If a particular task requires more time for completion than an available block of free time, the calendar and task scheduler in the illustrative embodiments may split the time allocated to complete the task into multiple time blocks to avoid overlapping any existing appointments and meetings. These multiple time blocks are then scheduled in the free time between meetings and appointments as needed to complete the task.

When entering tasks in the task scheduler, the user assigns a minimum block of time to each task. This minimum block of time comprises the minimum amount of time necessary to work on the particular task at one sitting. For example, if a task has a 5 minute start up and shut down time, it may not be worthwhile to the user to schedule the task in a 15 minute block of free time between appointments. Instead, the user may assign a minimum time block of 1 hour to the task. This minimum block of time for each task should also be considered when splitting the time allocated to complete a task into multiple time blocks.

The user may also assign a priority level to each meeting and task. The priority level may be a numerical value which indicates the importance of a particular meeting or task. Meetings and tasks with higher priority levels may be performed before other tasks with lower priority levels. Priorities are assigned to meetings and tasks so that when work on a higher priority task conflicts with a lower priority task or meeting, the higher priority task may be scheduled during lower priority meetings as needed in order to complete the higher priority task by the task's due date. Such lower priority tasks may be reallocated to a different time block in the user's calendar, and lower priority meeting may be cancelled, declined, or rescheduled. In addition, when scheduling a meeting, lower priority tasks or meetings may not appear in the user's calendar as 'booked' if the meeting that is being scheduled has a higher priority. It should be noted that the person or entity initiating a meeting with the user may suggest a priority for the meeting, which the user may factor in depending on criteria defined by the user.

The priority level assigned to each task may be changed automatically by the scheduling algorithm. For example, as the due date for a task approaches, the priority for the task may increase. In another example, the priority for a task may increase according to the number of changes to the published schedules of the task, thereby acting as a procrastination limit for the user.

The user may also assign meetings or tasks to classes which comprise specific sets of activities that may be performed by the user concurrently, thereby allowing these sets of activities to overlap on the user's calendar. These activities are typically low concentration activities. For example, meetings in the class "participate in a telephone conference call" may be specified to occur concurrently with tasks in the class "travel to the airport". The calendar and task scheduler in the illustrative embodiments may automatically double-book such identified items to allow multi-tasking on more than one task or meeting.

When the user enters one or more unscheduled tasks in the task scheduling tool, the scheduling algorithm in the illustrative embodiments locates the highest priority unscheduled and uncompleted task whose minimum time block fits into the next available block of free time. This identified task should have no unresolved dependencies on other tasks or meetings. If there are multiple tasks which meet these initial criteria, the scheduling algorithm gives preference to the task that has the least remaining time to completion. If the next available block of free time is less than or equal to the remaining time needed to complete the selected task, all of the next available free time is allocated to the task. If the next available block of free time is greater than the remaining time needed to complete the selected task, a portion of the next available free time comprising an amount of time equal to the time remaining for completion of the task is allocated to the task. In either case, the available free time (up to the remaining time for completion of the task) is allocated to the task and marked "scheduled" (no longer free) in the calendar. The scheduling algorithm repeats this process until all unscheduled tasks are scheduled.

As meetings and appointments are added to or removed from the user's calendar, the blocks of time which are allocated to scheduled tasks are automatically rescheduled based on priorities assigned to the meetings and the tasks. A free time function in the scheduling algorithm first looks for free time in the user's calendar to reschedule a task. The free time function then looks for time availability based on time blocks already booked for lower priority meetings or tasks. In this manner, tasks may be ordered based on the priority assigned to each task, and then the tasks are rescheduled within the free time indicated in the user's calendar, or within time blocks that already contain scheduled meetings or tasks but have a lower priority than the rescheduled task.

Figure 2:
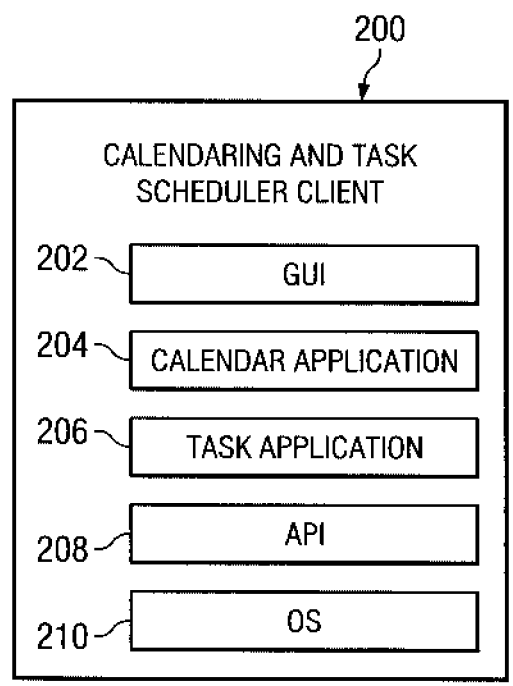
FIG. 2 is an exemplary block diagram illustrating components of a calendaring and task scheduling device in accordance with the illustrative embodiments.

Turning now to FIG. 2, an exemplary block diagram illustrating components of a calendaring and task scheduler device is shown in accordance with the illustrative embodiments. Calendaring and task scheduler client device 200 may include, for example, graphical user interface (GUI) 202, calendar application 204, task application 206, application programming interface (API) 208, and operating system (OS) 210.

A user of calendaring and task scheduler client 200 utilizes graphical user interface 202 to interact with the applications residing in calendaring and task scheduler client 200, such as calendar application 204 and task application 206. A graphical user interface is a graphics-based user interface that incorporates movable windows, icons, and a mouse. Graphical user interfaces have become the standard way users interact with computers.

The user may employ calendar application 204 and task application 206 to schedule events. A scheduled calendar event may be, for example, a scheduled appointment, a business meeting, a business trip, vacation, and the like. A calendar event may include a start and end time, a location, and a list of participants. A scheduled task event may include, for example, a task or project. A task event may include a start and end time, an estimated completion time, a due date, and any dependencies on other tasks or calendar events.

Application programming interface 208 allows the user of calendaring and task scheduler client 200, an individual, or a software routine, to invoke system capabilities using a standard consistent interface without concern for how the particular functionality is implemented.

Calendar application 204 and task application 206 may run, for example, on operating system 210. Calendar application 204 and task application 206 represents any number of software applications designed to react to data to provide the desired functionality the user seeks. The software applications represented by calendar application 204 and task application 206 may include those software applications necessary to handle data, video, graphics, photos, or text. Embodiments of the present invention may be implemented within calendar application 204 and task application 206 in these examples.

Operating system 210 is utilized to provide high-level functionality to the user and to other software. Such an operating system typically includes a basic input/output system.

In one embodiment, operating system 210, calendar application 204, and task application 206 may employ user input devices in order to obtain input from the user. User input devices may include a pointing device, such as a mouse, and a keyboard, or any other input device known to those of ordinary skill in the art. User input devices may be used, for example, to set user preferences in a preference window displayed on graphical user interface 202. However, embodiments of the present invention are not restricted to utilizing user input devices for the sole purpose of setting user preferences. The user input devices may be used for any purpose necessary to accomplish the processes of embodiments of the present invention. Although the illustrative embodiments are described in terms of receiving user input via user input devices to set preferences in the preference window and displaying the window on a graphical user interface, it should be noted that the illustrative embodiments may also be used in other implementations, such as a web service implementation which sets preferences for the calendaring and task applications without the use of user input devices.

A processor, such as, for example, processor 104 in FIG. 1, performs the basic operations in calendaring and task scheduler client 200. The processor may, for example, display information on graphical user interface 202. Graphical user interface 202 has a plurality of picture elements, collectively referred to as a screen, which may define the appearance of a user interface environment displayed on graphical user interface 202. Graphical user interface 202 screen contents and, therefore, the appearance of the user interface environment, may be controlled or altered by calendar application 204, task application 206, or operating system 210 either individually or in combination.

Figure 3:
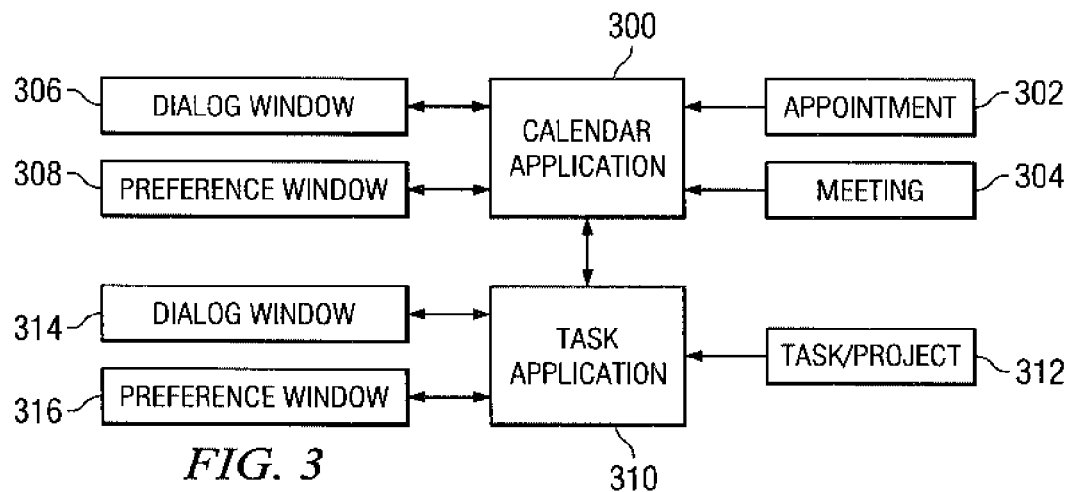
FIG. 3 is an exemplary block diagram illustrating calendar and task scheduling applications in accordance with the illustrative embodiments.

Referring now to FIG. 3, an exemplary block diagram illustrating a calendar application is depicted in accordance with the illustrative embodiments. The components shown in FIG. 3 may be located in a calendar application and a task application, such as calendar application 204 and task application 206 in FIG. 2. It should be noted that calendar application 204 and task application 206 may also be integrated in a single application, thereby providing calendaring and task scheduling functionality in the illustrative embodiments in one software application. The components shown in FIG. 3 may be implemented in a data processing system, such as, for example, data processing system 100 in FIG. 1.

Calendar application 300 may, for example, process appointment and meeting times for a user, such as appointment 302 and meeting 304. Calendar application 300 uses display window 306 to receive appointment 302 and meeting 304. In addition, display window 306 provides an interface for the user to input text with regard to appointment 302 and meeting 304, such as, for example, names of people involved, subject matter, description of the event, importance of the event, etc.

Calendar application 300 presents preference window 308 to provide the user with an interface to allow the user to set a variety of preferences. For example, the user may set a password to protect calendar application 300 from unwanted intrusion by other users. Moreover, the user may set a preference to link the calendar application to another application within the data processing system, such as a task scheduler application. For example, a user may set a preference in calendar application 300 to link calendar application 300 with task application 310. Furthermore, the user may use preference window 308 to set other preferences, such as the priority level of meeting 304. The priority level may be a numerical value which indicates the importance of a particular meeting. Meetings with higher priority levels may be performed before other tasks with lower priority levels. When meeting 304 is created by the user, the user is responsible for ensuring that the priority levels for the entries in the user's calendar are compatible on the same priority scale. If the user instead receives an invitation to meeting 304, meeting 304 may already have an associated priority level set by the meeting coordinator. In this case, the user may override the existing priority level in meeting invitations. Thus, while the meeting coordinator may suggest a priority level for meeting 304, the recipient user decides the final priority level. The priority level of meeting 304 may also be based on a profile set up by the user. The user may use filters in calendar application 300 to automatically assign a priority level when a meeting invitation is received based on various attributes of the invitation. For example, the filters in the user's profile may specify that meeting invitations from the user's boss will automatically be assigned the highest priority level. Other attributes used for filtering may include, but are not limited to, meeting topic, meeting location, meeting class, suggested priority of the meeting, the date/time of the meeting, other invitees (e.g., if Bill is attending the meeting, he can cover for me), RSVPs to the meeting, whether the meeting is designated as required/optional, etc.

The user may also assign meetings to classes which comprise specific sets of activities (meetings and tasks) that may be performed by the user concurrently in preference window 308. Types of activities may be predefined out of the box and users may add their own types of activities. Each type of activity may be associated with compatible types of activities which a person may perform concurrently. For example, as the scheduling algorithm looks for free blocks of time in which to schedule a task A, and the algorithm locates a task or meeting B on the calendar which has a compatible type of activity for task A, the algorithm schedules task A at the same time as task or meeting B. Thus, calendar application 300 may automatically double-book such identified items to allow multi-tasking on more than one task or meeting.

Task application 310 may, for example, process tasks and projects for the user, such as task/project 312. Task application 310 uses display window 314 to display task/project 312. In addition, display window 314 provides an interface for the user to input text with regard to task/project 312, such as, for example, a description of the task, the estimated amount of time required to complete the task, the due date of the task, etc. Any task with a scheduled completion after its due date may be visually distinguished from other tasks in display window 314, such as by having the task highlighted or displayed in a different color than other tasks in display window 314. Tasks with higher priority levels may also be visually distinguished from lower priority tasks in display window 314, such as by having the task highlighted or displayed in a different color than other tasks in display window 314.

Task application 310 presents preference window 316 to provide the user with an interface to allow the user to set a variety of preferences. The user may set a preference to link the task application to another application within the data processing system, such as a calendar application 300. For example, a user may set a preference in task application 310 to link task application 310 with calendar application 300. Furthermore, the user may use preference window 316 to set other preferences used by task application 310. For example, preference window 316 may allow the user to assign a minimum block of time to a task. The minimum block of time for each task comprises the minimum amount of time needed in the user's calendar to work on the particular task at one sitting in order to make working on the task during that block of time worthwhile to the user. The task will be scheduled in an available block of time in the user's calendar only if the block of time meets the minimum amount of time requirement set by the user.

The user may also use preference window 316 to assign a priority level to a task. The priority level may be a numerical value which indicates the importance of a particular task. Tasks with higher priority levels may be performed before other tasks with lower priority levels. When work on a higher priority task conflicts with a lower priority task or meeting, the higher priority task may be scheduled during lower priority meetings as needed in order to complete the higher priority task by the task's due date. Lower priority tasks may be reallocated to a different time block in the user's calendar, and lower priority meetings may be cancelled, declined, or rescheduled.

The user may also use preference window 316 to specify that the scheduling algorithm may automatically call a specified function or a policy to change the priority level assigned to each task when necessary. For example, the function or policy may raise the priority level for a task to the highest priority level if the task's estimated completion date is less than two work days before the task's due date. In another example, the priority level of a task may be raised by one priority level incrementally, up to the highest priority level, if the task's schedule has been published since the task's previous reschedule. Preference window 316 may also provide a means for the user to indicate that a task is very important. These very important tasks may be flagged such that their priority levels may not be automatically altered by the function or policy.

The user may also assign tasks to classes which comprise specific sets of activities (meetings and tasks) that may be performed by the user concurrently in preference window 316. Assigning tasks to such classes allows these sets of activities to overlap on the user's calendar. Task application 310 may automatically double-book such identified items to allow multi-tasking on more than one task or meeting.

Tasks may also be planned without being scheduled in the calendar or may be removed from the schedule while retaining information that the task contains. For example, this information may include contacts, history, references, unique problem approaches, and the like. Retaining the task information even if tasks are not scheduled enables a user to brainstorm on the tasks, such as document the tasks, arrange the tasks, etc., without being held accountable (by the user or anyone else) to accomplish the tasks.

Figure 4:
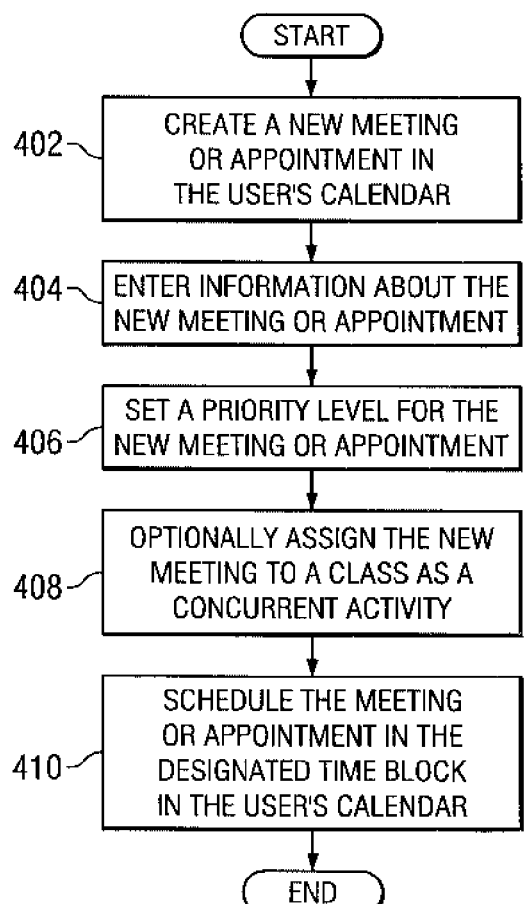
FIG. 4 is a flowchart illustrating an exemplary process for scheduling a meeting or appointment in accordance with the illustrative embodiments.

FIG. 4 is a flowchart of an exemplary process for scheduling a meeting or appointment in a calendaring and task scheduler in accordance with the illustrative embodiments. The process described in FIG. 4 may be implemented in a calendaring and task scheduler, such as calendaring and task scheduler client device 200 in FIG. 2.

The process begins when a new meeting or appointment is created in the user's calendar (step 402). When the new meeting or appointment is created, the user enters information about the meeting or appointment, such as the date, start and end times, the subject of the meeting or appointment, the attendees, etc (step 404).

The user also sets a priority level for the new meeting or appointment (step 406). The priority level indicates the importance of the meeting or appointment. The priority level set by the user may override any priority level already associated with the meeting or appointment. For example, when a meeting coordinator sends a meeting invitation to the user, the coordinator may assign a priority level to the meeting. However, when the user receives and accepts the invitation, the user may override the existing priority level assigned to the meeting and assign a higher or lower priority to the meeting based on policies defined for the calendar or the time of accepting the invitation.

The user may optionally assign the new meeting to a class of activities which may be performed concurrently with other classes of activities (step 408). Consequently, the blocks of time for the new meeting and a task that belongs to a concurrent class may overlap on the user's calendar.

Once the priority level (and if applicable, the concurrent activity designation) is set for the meeting or appointment, the meeting or appointment is scheduled in the designated time block in the user's calendar (step 410).

Figure 5:
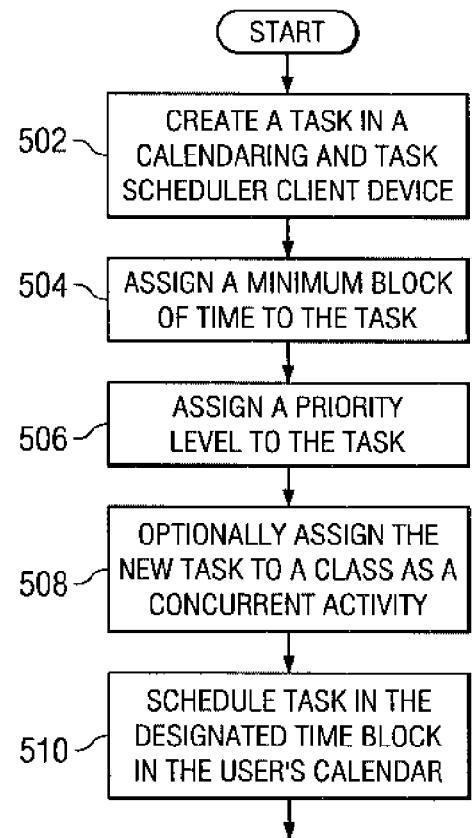
FIG. 5 is a flowchart illustrating an exemplary process for creating a task in accordance with the illustrative embodiments.

FIG. 5 is a flowchart of an exemplary process for creating tasks in a calendaring and task scheduler in accordance with the illustrative embodiments. The process described in FIG. 5 may be implemented in a calendaring and task scheduler, such as calendaring and task scheduler client device 200 in FIG. 2.

The process begins with the user first creating a task in a calendaring and task scheduler client device (step 502). The user may assign a minimum block of time to the task (step 504). This minimum block of time comprises the minimum amount of time necessary to work on the particular task at one sitting. The user also assigns a priority level to the task (step 506). The priority level indicates the importance of the task to the user.

The user may optionally assign the new task to a class as a concurrent activity (step 508). The task may be designated as an activity that may be performed by the user at the same time as another activity in another class that is designated as a class of activities that may be performed concurrently with activity of the first class. Consequently, the blocks of time for the new task and any concurrent activities may overlap on the user's calendar.

Once the priority level (and if applicable, the concurrent activity designation) is set for the task, the task is scheduled in the designated time block in the user's calendar (step 510).

Figure 6:
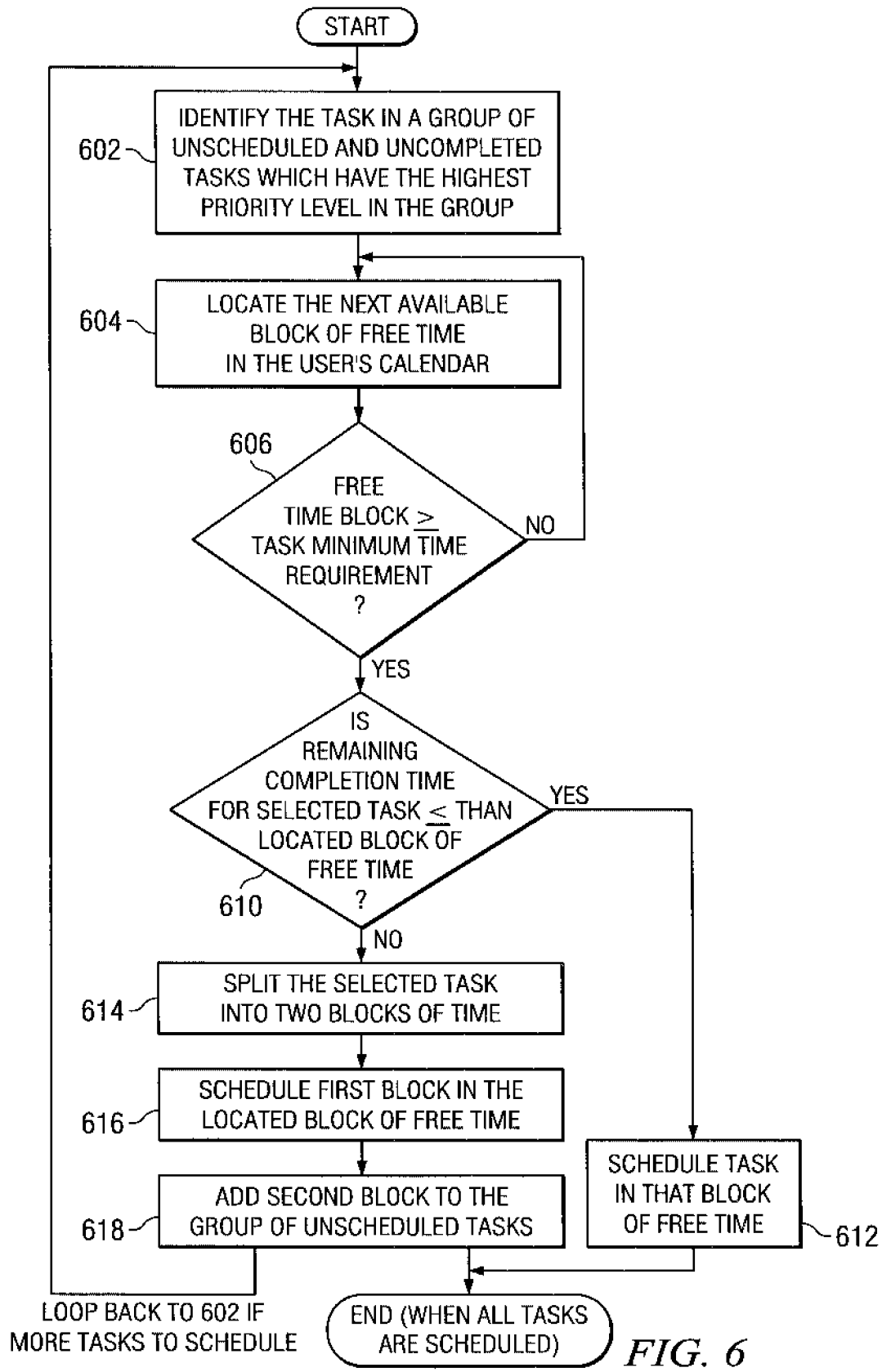
FIG. 6 is a flowchart illustrating an exemplary process for scheduling a task in accordance with the illustrative embodiments.

FIG. 6 is a flowchart illustrating an exemplary process for scheduling a task in accordance with the illustrative embodiments. The process described in FIG. 6 may be implemented by a scheduling algorithm in a calendaring and task scheduler, such as calendaring and task scheduler client device 200 in FIG. 2. The process occurs after a user has created one or more tasks in the calendaring and task scheduler as described in FIG. 5. The process also occurs after addition and removal of tasks and meetings as described in FIG. 7 and FIG. 8 and other events which affect the schedule such as changes in task priorities, meeting times and due dates. The process may have two passes. In the first pass, only available free time is considered in step 604 as time to schedule the task. If the task could not be scheduled for completion by its due date, the task and the chain of tasks on which it depends are rescheduled in a second pass in which meetings with lower priority or which are of a class that may be occur concurrently with the task being scheduled are considered as "free time" in step 604.

The process begins with the scheduling algorithm identifying the highest priority task with no unscheduled dependencies in a group of unscheduled and uncompleted tasks (step 602). If there are multiple unscheduled tasks which meet the criteria of having the highest priority level, the scheduling algorithm gives preference to and selects the task with the least remaining time to complete the task.

The scheduling algorithm then locates the next available block of free time in the user's calendar (step 604). If a second pass is made because the first pass did not schedule the task's completion before its due date, this step considers lower priority meetings or meetings of a class which allow concurrent work on the task as available "free time" for scheduling this task. Where such meetings and free time are chronologically adjacent, they are considered to be one block of "free time" for this step in the second pass. A determination is made by the scheduling algorithm as to whether the located block of free time meets (is greater than or equal to) the minimum time requirement for the selected task (step 606). If the located block of free time does not meet the minimum time requirement for the selected task ('no' output of step 606), the scheduling algorithm loops back to step 604 to locate the subsequent next available block of free time in the user's calendar.

If that located block of free time meets the minimum time requirement for the selected task ('yes' output of step 606), a determination is made as to whether the remaining completion time for the selected task is less than or equal to that located block of free time (step 610). If the remaining completion time for the selected task is less than or equal to that located block of free time ('yes' output of step 610), the scheduling algorithm schedules the task in that block of free time (step 612).

If the remaining completion time for the selected task is greater than that located block of free time ('no' output of step 610), the scheduling algorithm splits the selected task into two blocks of time, such that the first of the two blocks will fit into the located block of free time (step 614). The first of the two blocks is scheduled in the located block of free time (step 616), and the second of the two blocks is added back to the group of unscheduled tasks (step 618). The scheduling algorithm then returns to step 602 to schedule the second block of time. In this manner, the selected task may be split into various time blocks in order to be scheduled within the available blocks of free time within the user's calendar. For example, if the next available block of free time is 2 hours, and the remaining completion time for the task is 4 hours, the selected task may be split into a first block of 2 hours and a second block of 2 hours. In this manner, the first block of the task may be scheduled into the next available time block. To schedule the remaining second block of time in the user's calendar, the scheduling algorithm may schedule the second block of time into the subsequent next available block of time, if that block of time is greater than or equal to the second block of time. If the subsequent next available block of time is less then the second block of time for the task, the scheduling algorithm may further split the second block of time for the task into additional blocks of time in order to fit those blocks into the available free time in the user's calendar and to complete the task within the task's due date.

After the task is completely scheduled, the scheduling algorithm loops back to step 602 to select and schedule the next unscheduled task. The process continues until all tasks are scheduled.

Figure 7:
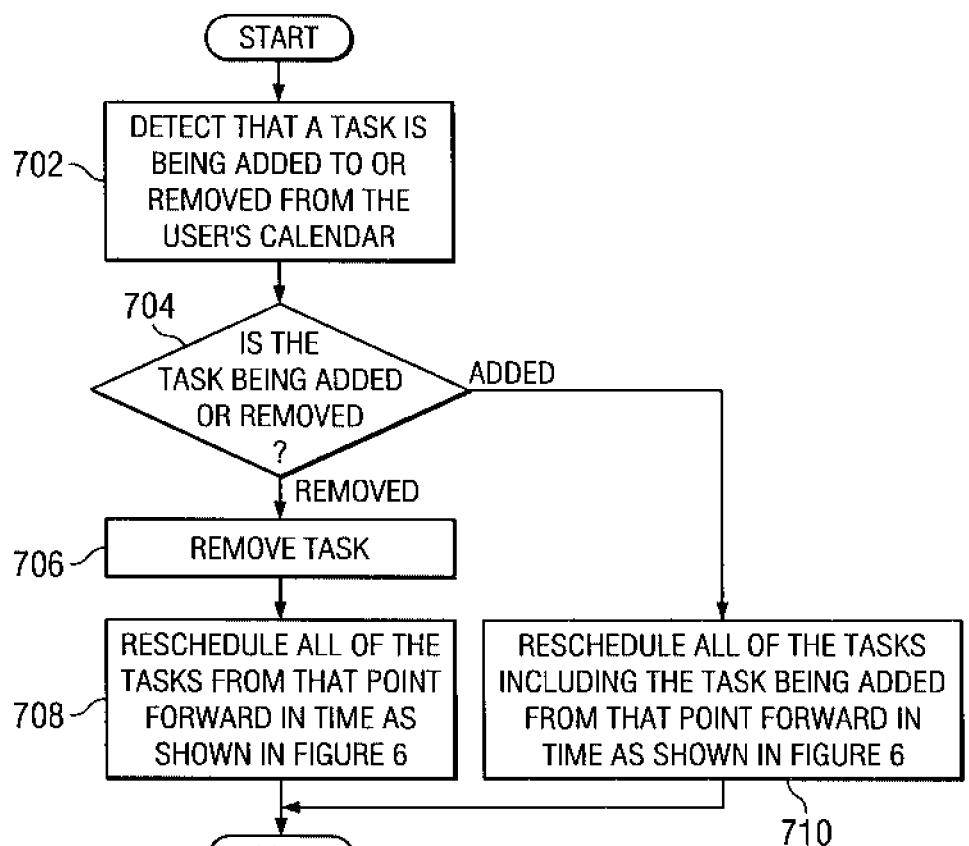
FIG. 7 is a flowchart illustrating an exemplary process for rescheduling a task in accordance with the illustrative embodiments.

FIG. 7 is a flowchart illustrating an exemplary process for rescheduling a task in accordance with the illustrative embodiments. The process described in FIG. 7 may be implemented by the scheduling algorithm in a calendaring and task scheduler, such as calendaring and task scheduler client device 200 in FIG. 2.

The process begins when the scheduling algorithm detects that a task is being added to or removed from the user's calendar (step 702). The scheduling algorithm then determines whether the task is being added or removed (step 704).

If the task is being removed from the user's calendar ('removed' output of step 704), the scheduling algorithm removes the scheduled task (step 706) and then reschedules all of the tasks from that point forward in time to another (earlier) block of time in the user's calendar (step 708). This rescheduling follows the process illustrated in FIG. 6.

If the task is being added to the user's calendar ('added' output of step 704), the scheduling algorithm reschedules all tasks from that point forward in time along with the new task being added (step 710), following the process illustrated in FIG. 6. That is, all of the tasks from that point forward in time are removed from the schedule and added to the group of unscheduled tasks, and then rescheduled along with the added task.

Figure 8:
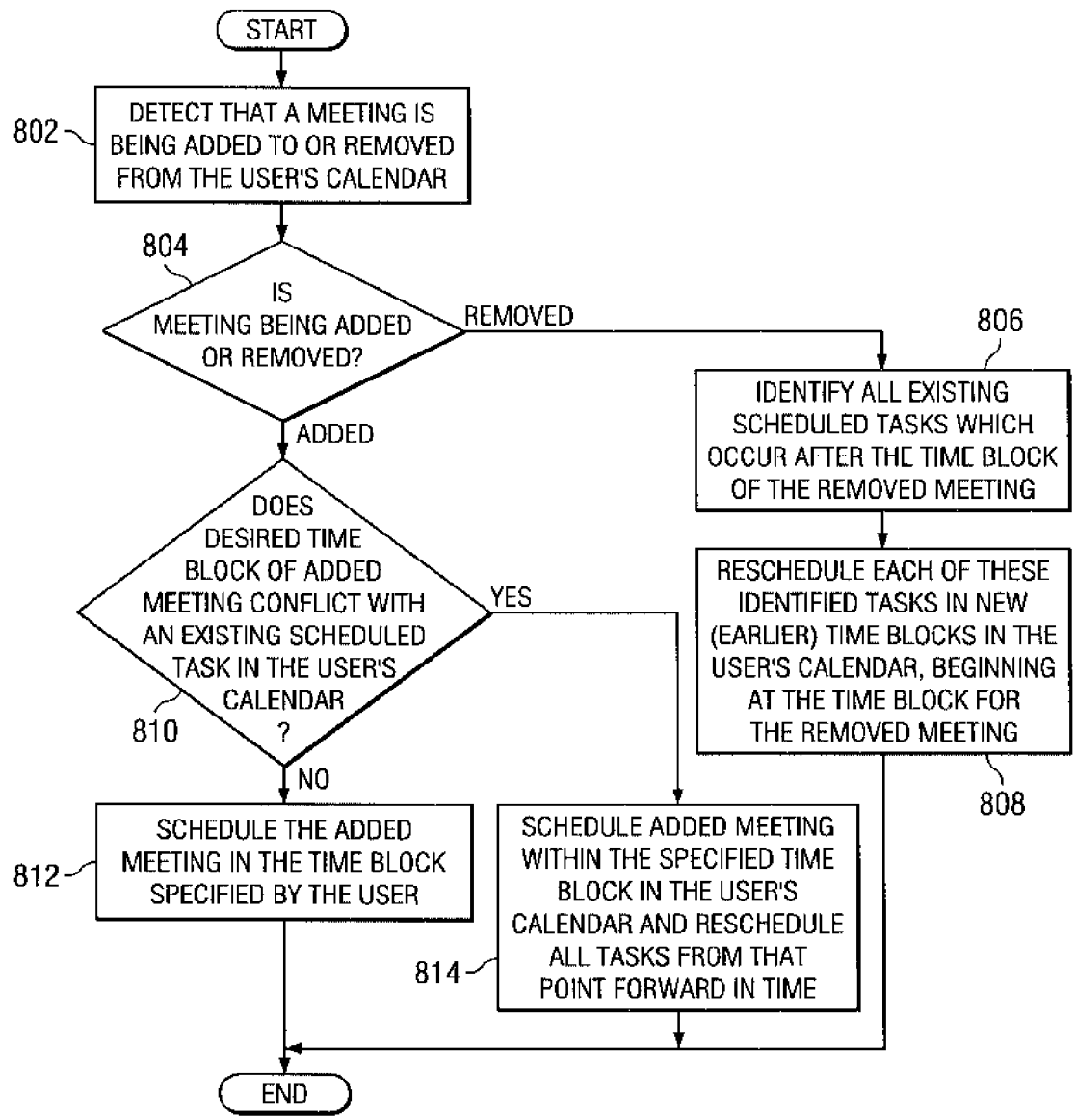
FIG. 8 is a flowchart illustrating an exemplary process for rescheduling a task in accordance with the illustrative embodiments.

FIG. 8 is a flowchart illustrating an exemplary process for rescheduling a task in accordance with the illustrative embodiments. The process described in FIG. 8 may be implemented by the scheduling algorithm in a calendaring and task scheduler, such as calendaring and task scheduler client device 200 in FIG. 2.

The process begins when the scheduling algorithm detects that a meeting is being added to or removed from the user's calendar (step 802). The scheduling algorithm then determines whether the meeting is being added or removed (step 804). If the meeting is being removed from the user's calendar ('removed' output of step 804), the scheduling algorithm identifies all existing scheduled tasks which occur after the time block of the removed meeting (step 806). Each of these identified tasks are rescheduled in new (earlier) time blocks in the user's calendar, beginning at the time block for the removed meeting (step 808). This rescheduling follows the process illustrated in FIG. 6.

If the meeting is being added to the user's calendar ('added', output of step 804), the scheduling algorithm determines if the desired time block specified to be scheduled for the added meeting conflicts with an existing scheduled task in the user's calendar (step 810). A conflict may include any overlap in the time block for the added meeting with the time block scheduled for the existing task. If the time block to be scheduled for the added meeting does not conflict with the time block for an existing scheduled task ('no' output of step 810), the scheduling algorithm schedules the added meeting in the time block specified by the user (step 812), with the process terminating thereafter.

If the time block to be scheduled for the added meeting conflicts with the time block for an existing scheduled task ('yes' output of step 810), the scheduling algorithm schedules the added meeting in the time block specified by the user and reschedules all tasks from that point forward in time, following the process illustrated in FIG. 6 (step 814). In this manner, the time block assigned to a lower priority meeting may overlap a higher priority task which cannot be moved without missing its due date. Thus, while the lower priority meeting is scheduled at the specified time block, the lower priority meeting is flagged as conflicting with a higher priority task. In contrast, lower priority tasks which may overlap with higher priority tasks are rescheduled to a different time block by the scheduling algorithm. In an alternative embodiment, the scheduling algorithm may not schedule the lower priority meeting if it conflicts with a higher priority task which cannot be moved without missing its due date. Instead, the scheduling algorithm may send a notice to the meeting coordinator or other meeting participants declining the meeting invitation.

Figure 9:
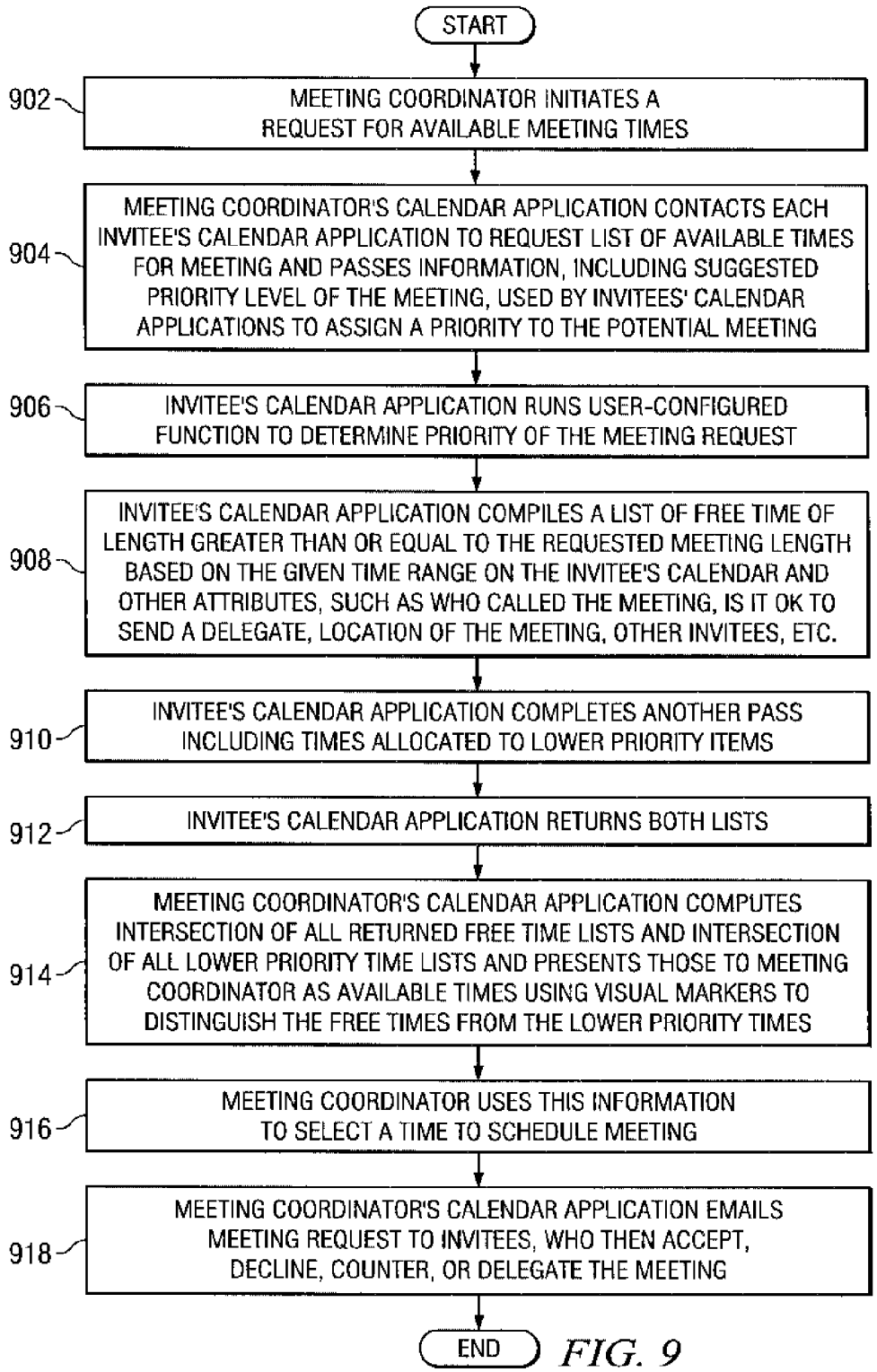
FIG. 9 is a flowchart illustrating an exemplary process for scheduling a meeting in accordance with the illustrative embodiments.

FIG. 9 is a flowchart illustrating an exemplary process for scheduling a meeting in accordance with the illustrative embodiments. The process described in FIG. 9 applies when a meeting appointment is being added or removed from the user's calendar. The process described in FIG. 9 may be implemented by the scheduling algorithm in a calendaring and task scheduler, such as calendaring and task scheduler client device 200 in FIG. 2.

The process begins when meeting coordinator initiates a request for available meeting times (step 902). The meeting coordinator's calendar application contacts each of the invitee's calendar applications to request a list of available times for a given meeting of a given length in a given time range, passing along information (including the meeting coordinator's suggested priority level of the meeting) that each invitee's calendar application could use to assign a priority to the potential meeting, such as who called the meeting, whether the invitee is required or optional, and meeting topic (step 904). Upon receiving the request for available times, an invitee's calendar application runs a user-configured function to determine the priority of the meeting request (step 906). An invitee's calendar application looks at the given time range on the invitee's calendar and other attributes (e.g., who called the meeting, is it okay to send a delegate, meeting location, other meeting invitees, etc.) and compiles a list of free times of length greater than or equal to the requested meeting length (step 908). An invitee's calendar application then completes another pass and compiles a list of times allocated to lower priority items (step 910), and then returns both lists (step 912). The meeting coordinator's calendar application computes the intersection of all of the returned free time lists and also computes the intersection of all of the lower priority time lists and presents the intersections to the meeting coordinator as available meeting times, using visual markers to distinguish the free times from the lower priority times (step 914). The meeting coordinator then uses this information to select a time to schedule the meeting (step 916). The meeting coordinator's calendar application then emails the meeting request to the invitees who may then accept, decline, counter, or delegate the meeting (step 918).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method operable by a computer for managing a user's tasks within an integrated calendaring and task scheduler, the computer implemented method comprising:
    creating a first task to be performed by a user in the user's calendaring and task scheduler in the computer, wherein the first task comprises a completion block of time;
    determining if there is an available block of free time prior to a due date of the first task in the user's calendaring and task scheduler;
    responsive to determining that there are no available blocks of free time in the user's calendaring and task scheduler prior to the due date of the first task, comparing a priority level of the first task and a priority level of a meeting or second task scheduled in the calendaring and task scheduler; and
    responsive to determining that the priority level of the meeting or second task is lower than the priority level of the first task, scheduling the first task over at least a portion of a time block of the lower priority meeting or second task.

2. The method of claim 1, wherein meetings or tasks having lower priority than the first task are visually distinguished from the first task.

3. The method of claim 1, wherein the lower priority meeting or second task is one of canceled, declined, or rescheduled to a different time block in the calendaring and task scheduler.

4. The method of claim 1, further comprising:
    assigning a minimum time block to the first task, wherein the minimum time block indicates a minimum amount of time required in an available block of time to schedule the first task in the available block of time.

5. The method of claim 4, further comprising:
    responsive to determining that a meeting is added to, removed from, or changed in the user's calendaring and task scheduler, rescheduling all uncompleted tasks occurring at a point of the added, removed, or changed meeting or task forward in time.

6. The method of claim 5, wherein removing a task from the calendaring and task scheduler includes retaining information about the task to enable the task to be managed without having an accountability of accomplishing the task.

7. The method of claim 1, further comprising:
    scheduling a second meeting in the calendaring and task scheduler, wherein tasks and meetings having a lower priority than the second meeting do not appear as booked in the calendaring and task scheduler if the second meeting has a higher priority.

8. A method operable by a computer for managing tasks within an integrated calendaring and task scheduler, the computer implemented method comprising:
    assigning a priority level to a task when the task is created in a user's calendaring and task scheduler in the computer;
    comparing a due date of the task against a completion date of the task; and
    responsive to determining that the due date of the task is within a predetermined proximity to the completion date of the task, adjusting the priority level of the task based on the predetermined proximity of the due date to the completion date.

9. The method of claim 8, further comprising:
publishing a schedule of the task;
incrementing a counter of the published schedule; and
responsive to determining that a number in the counter exceeds an allowable number of publishings, adjusting the priority level of the task.

10. The method of claim 8, wherein adjusting the priority level of the task based on the predetermined proximity of the due date to the completion date comprises incrementally increasing the priority level of the task up to a maximum priority level.

11. The method of claim 8, further comprising:
    assigning a priority level to a meeting created in the user's calendar.

12. The method of claim 11, wherein the user overrides the priority level initially set in a meeting invitation.

13. The method of claim 11, wherein the priority level of the meeting is based on a profile entered by the user.

14. The method of claim 13, further comprising:
    using filters in the calendaring and task scheduler to automatically assign a priority level to the meeting based on the profile when a meeting invitation is received.

15. The method of claim 14, wherein the filters are based on one or more attributes, including meeting topic, meeting location, suggested priority of the meeting, date and time of the meeting, other invitees, meeting class, RSVPs received for the meeting, or required/optional designation.

16. The method of claim 8, wherein an important task is flagged to indicate that the important task is not a candidate for automatic adjustment of the priority level of the task.

* * * * *